F. COOPER AND G. C. HILL.
COTTER PIN EXTRACTOR.
APPLICATION FILED FEB. 28, 1920.
1,382,477.
Patented June 21, 1921.
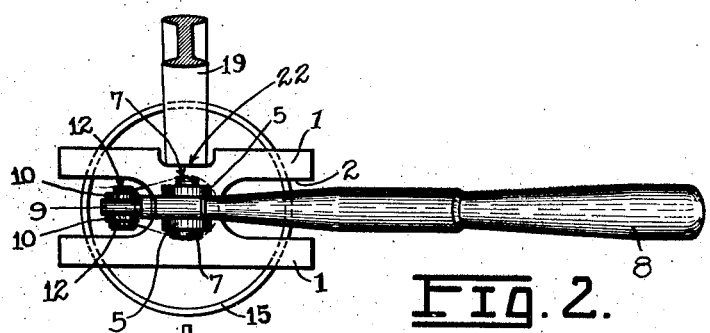
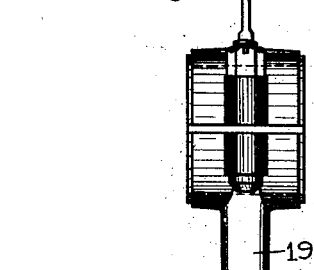
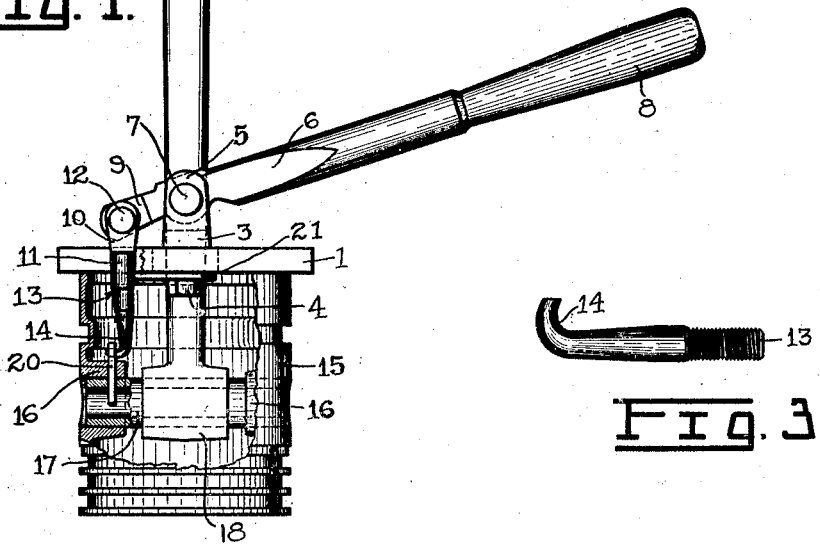
Inventors
Frank Cooper
G. C. Hill
By their Attorneys
Mason Fenwick Lawrence

UNITED STATES PATENT OFFICE.

FRANK COOPER AND GEORGE CLIFFORD HILL, OF SEATTLE, WASHINGTON.

COTTER-PIN EXTRACTOR.

1,382,477.  Specification of Letters Patent.  Patented June 21, 1921.

Application filed February 28, 1920. Serial No. 361,942.

*To all whom it may concern:*

Be it known that we, FRANK COOPER, a subject of the King of England, and GEORGE CLIFFORD HILL, a citizen of the United States, residing at Seattle, in the county of King and State of Washington, have invented certain new and useful Improvements in Cotter-Pin Extractors; and we do hereby declare the following to be a full, clear, and exact description of the invention, such as will enable others skilled in the art to which it appertains to make and use the same.

This invention relates to new and useful improvements in hand operated tools and more particularly to what will be hereafter known as a cotter pin extractor which is especially adapted for use in extracting cotter pins which are used for connecting the piston head of an engine to the piston rod.

The main object of the present invention is the provision of a cotter pin extracting tool which can be readily used in positions where the well-known straight lever extractor or pliers could not be used as the cotter pins which are used in connecting a piston head to the piston rod are driven tightly and consequently are hard to remove by a straight pull.

In the general construction of gas engines, the pistons therefor are of tubular form with a wrist pin passing through the piston head near the center thereof, the wrist pin also passing through one end of the ordinary piston rod and in order to retain the wrist pin securely in position, a cotter pin is driven through a portion of the piston head and into the wrist pin. In order to withdraw this cotter pin when it is desired to remove the piston head, considerable force must be applied, but owing to the recessed position of the cotter pin, the ordinary tools are ineffective for this purpose and it is the object of our invention to provide a tool which will overcome this difficulty.

With the above and other objects in view, the invention consists in the construction, in the combination and arrangement of parts pointed out in the claims and illustrated in the accompanying drawings in which—

Figure 1 is a side elevation of the application of our tool, parts of the piston head being broken away and illustrated in part section, Fig. 2 is a top plan view, and Fig. 3 is a side elevation of one of the removable hook members.

In the construction of our improved tool, we provide a base member generally indicated in the drawings by the numeral 1 and as illustrated is provided at each end thereof with the recessed or cutaway portions 2. This base 1 is to be formed of a size sufficient to be arranged upon the ends of various sizes of piston heads. Arranged centrally within this base member 1 is a post 3 one end of which extends through the base and is provided with a suitable nut 4 to retain the post in position upon the base. The other end of the post 3 is provided with spaced ears 5 between which is mounted a lever 6 retained in position between the ears 5 by means of the pivot pin 7.

One end of the lever 6 extends outwardly at a considerable distance and is provided with a handle member 8, while the other end of the lever is provided with a flattened portion 9 adapted to be disposed between the spaced ears 10 formed upon one end of the socket member 11. These ears 10 are mounted for swinging movement upon the end of the lever 6 by means of the pivot pin 12 which extends through the ears and through the flattened portion of the lever. The socket 11 which is mounted for swinging movement upon the end of the lever 6 is interiorly threaded to receive the threaded portion 13 of a hook member 14 whereby it will be readily apparent that this hook member 14 can be quickly and easily engaged with the socket 11 or removed therefrom as desired. It is to be understood that by having the hook member 14 detachably connected with the socket 11, various sizes of hooks can be readily interchanged when desired.

In the general construction of piston heads, as will be clearly illustrated in Fig. 1, the piston head 15 is provided at its central portion with the inwardly projecting sleeves 16 and arranged within the piston is a wrist pin 17, the ends of which are disposed within the sleeves 16. This wrist pin 17 extends through the sleeve 18 on the piston rod 19 and is securely held in position by means of the cotter pins 20 which extend through the sleeves 16, carried by the piston head and engaged within the ends of the wrist pin 17. From this, it will be apparent that the wrist pin is securely held in position within the piston head 15. It will be noted that upon the post 3 we have provided a washer generally indicated by the numeral 21 and this washer is preferably substantially elongated so that one end projects outwardly beneath the inner end of one of the recessed portions 2 so that when the hook member 14 is dropped downwardly through one of the recessed portions for engagement with the cotter pin this extended end of the washer 21 will engage with the tapering outer wall of the socket 11 and as the socket and hook member pass downwardly into the piston head, the end of the washer 21 will force the hook portion into engagement with the eye of the cotter pin as illustrated in Fig. 1.

In the general operation of our improved cotter pin extractor, the base 1 is arranged over the end of the piston head and the hook member 14 lowered through one of the recessed portions 2 until the same is engaged with the cotter pin; the handle member 8 is then grasped by the operator and sufficient pressure brought to bear thereon to force the same downwardly and thus remove the cotter pin from its seat. It will be noted that one side of the base member 1 is recessed as shown at 22 to receive the piston rod 19 so that the base plate can be positioned centrally over the end of the piston head.

What we claim is:

1. A tool of the class described including a base, a pivot post carried by the base, a lever pivotally mounted upon said post, a socket connected to the lever at one end and a hook member detachably connected with said socket.

2. A tool of the class described including a base, a pivot post carried by the base, a lever pivotally mounted upon said post, an adjustable socket connected to the lever at one end and a hook member detachably connected with said socket.

3. A tool of the class described, including a base member recessed at one side thereof to receive a piston rod, a lever pivotally mounted on the base, a handle portion at one end of the lever and a hook member pivotally connected with the other end thereof.

4. A tool of the class described including a base provided with recessed end portions, a pivoted lever mounted upon the base, a handle formed at one end of the lever, a socket pivotally connected to the other end of the lever and interchangeable hook members detachably connected with said socket.

5. A tool of the class described including a base member, a post carried thereby, spaced ears formed at one end of said post, a lever mounted for pivotal movement between said ears, a socket pivotally connected at one end of the lever and provided with inter screw threads and interchangeable hook members having screw threads for engagement with the socket.

6. A tool of the class described including a base member, a post carried thereby, a lever mounted for pivotal movement upon the post, a hook member pivotally connected to one end of the lever nearest the pivot point and a washer mounted on the pivot post for engagement with the hook as and for the purpose set forth.

7. A tool of the class described including a base plate, a pivot post carried thereby, a pivot pin supported by the post, a lever mounted upon said pivot pin and a hook member pivotally connected to the end of the lever nearest the pivot point.

8. A device of the class described, including a pivot post, a lever pivotally supported upon said post, a hook member suspended from one end of the lever and a washer on the pivot post for engagement with the hook on its downward movement to force the same into engagement with the object to be operated upon.

In testimony whereof we affix our signatures.

FRANK COOPER.
G. CLIFFORD HILL.